H. J. HARTMAN.
GEARING FOR WAVE MOTORS AND THE LIKE.
APPLICATION FILED JAN. 21, 1914.
1,121,923.
Patented Dec. 22, 1914.
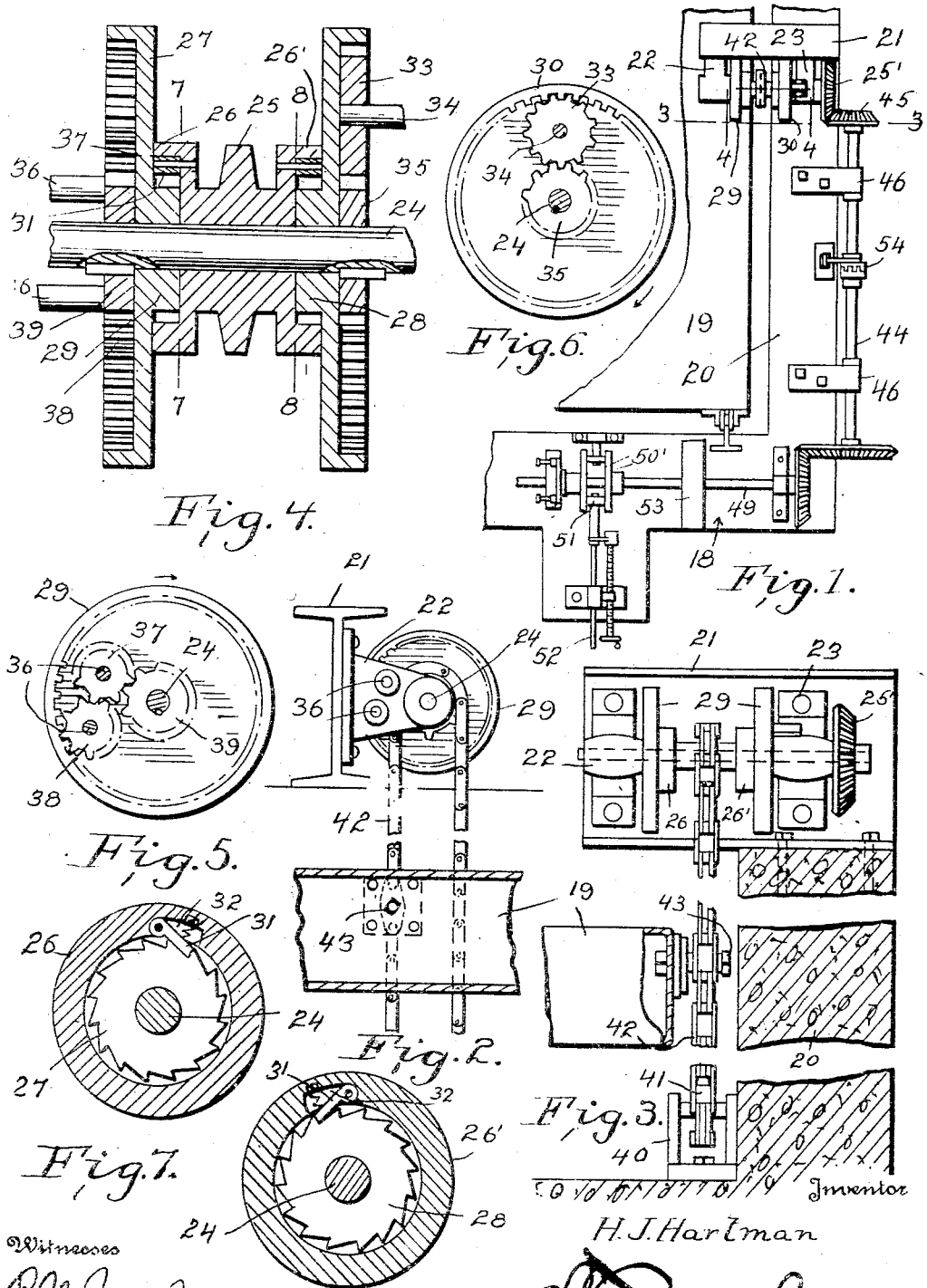

UNITED STATES PATENT OFFICE.

HENRY J. HARTMAN, OF PITTSBURGH, PENNSYLVANIA.

GEARING FOR WAVE-MOTORS AND THE LIKE.

1,121,923.

Specification of Letters Patent.

Patented Dec. 22, 1914.

Original application filed July 22, 1913, Serial No. 780,566. Divided and this application filed January 21, 1914. Serial No. 813,539.

*To all whom it may concern:*

Be it known that I, HENRY J. HARTMAN, a citizen of the United States, residing at Pittsburgh, in the county of Allegheny and State of Pennsylvania, have invented certain new and useful Improvements in Gearing for Wave-Motors and the like; and I do hereby declare the following to be a full, clear, and exact description of the invention, such as will enable others skilled in the art to which it appertains to make and use the same.

This invention is a division of my pending application for patent for wave motors filed July 22, 1913, Serial No. 780,566, and has for its primary object to provide a simple and practical system of gearing for transforming reciprocatory motion into indirectional motion.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a top plan view of my gearing, a portion of a wave motor being shown, Fig. 2 is a fragmentary vertical sectional view taken on the plane passing longitudinally through the float, Fig. 3 is a view taken on the plane of line 3—3 of Fig. 1, Fig. 4 is a section taken on the plane of line 4—4 of Fig. 1, Figs. 5 and 6 are left and right end elevations respectively of the mechanism shown in Fig. 4, Fig. 7 is a section taken on the plane of line 7—7 of Fig. 4, Fig. 8 is a section taken on the plane of line 8—8 of Fig. 4.

Referring in detail to the drawings by numerals, 18 designates a portion of a float chamber and 19 a float vertically movable therein. A shaft 21 in the form of an I-beam is positioned upon the top of the float 19 and projects over the float chamber for a slight distance. This support is for the purpose of holding a set of driving mechanism to be actuated by an upward and downward movement of the float. Bearing brackets 22 and 23 are secured to the I-beam, and project at right angles thereto and support the shaft 24, which has a bevel gear 25' rigidly secured to its outer end. A sprocket wheel 25 is mounted on the shaft 24 between the bearings 22 and 23 and is formed upon opposite sides with annular housings 26 and 26' which inclose ratchets 27 and 28, formed upon opposite faces of the large internal gears 29 and 30 respectively. Pawls 31 are pivoted in recesses 32 formed within the housings 26 and 26' and engage the teeth of the ratchets 27 and 28. It will be noted upon references to Figs. 7 and 8, that these ratchets are formed with oppositely facing teeth. The sprocket gear 25 and the gears 29 and 30 are loosely positioned upon the shaft 24. A pinion 33 is journaled upon a stub shaft 34 carried by the bracket 23 and meshes with the internal teeth on the gear 30 and with the smaller gear 35 keyed to the shaft 24. The bracket 22 supports, by means of the shaft 36, the pinions 37 and 38. The pinion 38 meshes with the internal teeth on the gear 29 and with the pinion 37, which latter meshes with a gear 39 rigidly secured to the shaft 24.

A bearing 40 is secured to the bottom of the float chamber and carries a sprocket wheel 41 over which an endless sprocket chain 42 passes. As shown in Figs. 2 and 3, this chain is attached to a pin or trunnion 43 formed upon one side of the float and run over a sprocket wheel 25. It will be seen that as the float rises and lowers, the chain will be actuated so as to cause a rotation of the shaft 24, which drives the horizontal shaft 44 through the medium of the bevel gears 25' and 45. The shaft 44 is journaled through a bearing 46 supported upon the upper edge of the side wall and carries rigidly secured thereto a bevel gear 47, which meshes with a bevel gear 48 on the extremity of the transverse shaft 49, which is journaled through a bearing 50 upon the top of the end wall.

The transverse shaft 49 drives by means of friction gears 50' and 51 a shaft 52, which may be coupled to any desired machine. The shaft 49 is provided with a flywheel 53 and, if desired, the shaft 44 may be formed in two sections connected by a clutch 54.

In operation, as the float rises, the sprocket wheel 25 will be rotated in the direction indicated by the arrow in Fig. 7, causing the pawl carried within the housing 26 to rotate the gear 29 in a direction indicated by the arrow in Fig. 5, and the shaft 24 will be driven through the medium of the gears 37 and 38 in a similar direction. During this upward movement of the float, the pawl carried within the housing 26 rides freely over its ratchet. When the float descends, the sprocket 25 will be rotated in the direction indicated by the arrow in Fig. 8, causing the pawl 31 within the housing 26' to lockingly engage the ratchet 38 and rotate the gear 30 in the direction indicated by the arrow in Fig. 6, which will cause the shaft 24 to be rotated in the same direction as before. It will be understood that the float may be coupled to as many sets of driving mechanisms as desired and that this system of gearing may be used in other ways than the one described.

It is to be understood that while I have shown and described the preferred embodiment of my invention, I do not wish to be limited to this exact construction, combination and arrangement of parts, but may make such changes as will fall within the spirit and scope of the invention as claimed.

Having thus described my invention, I claim:—

1. The combination of a rotatable shaft, a sprocket wheel loosely mounted on said shaft and having housings formed on opposite sides thereof, internal gear wheels loosely mounted upon the shaft on opposite sides of the sprocket wheel, ratchets formed upon the opposed sides of the internal gear wheels and fitting within said housings, the ratchets being provided with oppositely facing teeth, pawls carried by the housings for engagement with said ratchets, means whereby the rotation of the internal gear wheels will drive said shaft, and means for rotating the sprocket wheel in opposite directions.

2. The combination of a rotatable shaft, a sprocket wheel loosely mounted upon the shaft, housings formed upon opposite sides of the sprocket wheel, internal gears loosely mounted upon the shaft, ratchets formed upon said gears and fitting within the housings, said ratchets being formed with oppositely facing teeth, pawls carried by the housings for engagement with the teeth, spur gears rigidly secured to the shaft, a gear meshing with one of said spur gears and with one of the internal gears, a pair of intermeshing gears, one of which meshes with the other internal gear and the other of which meshes with the other gear rigid with the shaft, and means for rotating the sprocket wheel in opposite directions, whereby the shaft will be driven continuously in one direction.

In testimony whereof I affix my signature in presence of two witnesses.

HENRY J. HARTMAN.

Witnesses:
JOHN K. SCHLUEDERBERG,
CONRAD MULLER.